United States Patent
Potter et al.

(10) Patent No.: US 9,347,109 B2
(45) Date of Patent: *May 24, 2016

(54) COMBINED PRE-TREATMENT PROCESS FOR ENABLING FEED MATERIAL TO BE CHARGED IN DIRECT REDUCTION PROCESSES

(75) Inventors: Stephen M. Potter, Rio de Janeiro (BR); Pedro Gutemberg Quariguasi Netto, Rio de Janeiro (BR)

(73) Assignee: VALE S.A., Rio de Janeiro (BR)

( * ) Notice: Subject to any disclaimer, the term of this patent is extended or adjusted under 35 U.S.C. 154(b) by 0 days.

This patent is subject to a terminal disclaimer.

(21) Appl. No.: 10/789,694

(22) Filed: Feb. 27, 2004

(65) Prior Publication Data
US 2005/0000320 A1     Jan. 6, 2005

Related U.S. Application Data

(60) Provisional application No. 60/450,855, filed on Feb. 28, 2003.

(51) Int. Cl.
| | |
|---|---|
| C21B 13/02 | (2006.01) |
| C21B 13/14 | (2006.01) |
| C22B 1/00 | (2006.01) |
| C22B 5/12 | (2006.01) |

(52) U.S. Cl.
CPC ............. *C21B 13/14* (2013.01); *C21B 13/02* (2013.01); *C22B 1/00* (2013.01); *C22B 5/12* (2013.01); *C21B 2100/02* (2013.01); *C21B 2100/04* (2013.01); *Y02P 10/136* (2015.11); *Y02P 10/265* (2015.11); *Y02P 10/283* (2015.11)

(58) Field of Classification Search
USPC ........... 75/414, 490, 488, 489, 496, 498, 440, 75/484, 3, 7, 10.34, 1, 25, 321, 751, 767, 75/443, 327, 10.48, 503; 266/156, 175, 266/142, 160, 182, 162, 154, 197; 55/6; 226/156, 175, 142, 160, 182

See application file for complete search history.

(56) References Cited

U.S. PATENT DOCUMENTS

| | | | | |
|---|---|---|---|---|
| 3,645,717 | A | * | 2/1972 | Meyer et al. ............. 75/479 |
| 3,764,123 | A | * | 10/1973 | Beggs et al. ............ 266/140 |
| 3,831,913 | A | * | 8/1974 | Ando et al. ............. 266/138 |

(Continued)

FOREIGN PATENT DOCUMENTS

| | | | | |
|---|---|---|---|---|
| EP | 0003665 | * | 8/1979 | |
| JP | 01152225 A | * | 6/1989 | ............. C22B 5/10 |

OTHER PUBLICATIONS

Lodeston Iron Ore Project, Preliminary Evaluation, PBK Engineering Ltd. Project No. 91095, Jan. 1992 (pp. 1-1 and 6-1).*

(Continued)

*Primary Examiner* — George Wyszomierski
*Assistant Examiner* — Tima M McGuthry Banks
(74) *Attorney, Agent, or Firm* — Arent Fox LLP

(57) ABSTRACT

An improved method and apparatus for pretreatment of solid lump feed material for gas and pellet/lump-based direct reduction processes, by initially storing the lump feed in stockpiles for stress release, followed by pre-drying the feed material prior to charging into the reduction furnace and finally increasing the average temperature of the reduction furnace, in order to reduce the amount of reduction at low temperatures, thereby minimizing the formation of fines within the furnace.

14 Claims, 3 Drawing Sheets

(56) References Cited

U.S. PATENT DOCUMENTS

| | | | | |
|---|---|---|---|---|
| 3,928,021 | A | * | 12/1975 | Matsubara et al. ............ 75/448 |
| 3,941,582 | A | * | 3/1976 | Baum ......................... 75/10.17 |
| 4,049,435 | A | * | 9/1977 | Lotosh et al. .................. 75/768 |
| 4,367,091 | A | * | 1/1983 | Fujita et al. .................... 75/323 |
| 5,437,708 | A | * | 8/1995 | Meissner et al. ................ 75/490 |
| 5,445,363 | A | * | 8/1995 | Becerra-Novoa et al. .... 266/182 |
| 5,810,906 | A | * | 9/1998 | Stephens, Jr. .................. 75/505 |
| 6,372,016 | B1 | * | 4/2002 | Kamikawa et al. ............. 75/484 |
| 6,395,056 | B1 | * | 5/2002 | Villarreal-Trevino et al. . 75/496 |
| 7,175,690 | B2 | * | 2/2007 | Potter et al. .................... 75/488 |
| 2004/0261575 | A1 | * | 12/2004 | Potter et al. .................... 75/488 |

OTHER PUBLICATIONS

The Metallurgy of Iron and Steel, Bradley Stoughton, $1^{st}$ edition ($3^{rd}$ impression), Hill Publishing Co. 1908 (pp. 19-22).*

Lodestone Iron Ore Project, Preliminary Evaluation, PBK Engineering Ltd., Jan. 1992.*

U.S.S. "The Making Shaping, and Treating of Steel", United States Steel, $10^{th}$ Edition, 1985, pp. 257-265 and 569-571.*

Varajao et al. "Microporosity of BIF hosted massive hematite ore, Iron Quadrangle, Brazil." Anais da Academia Brasileria de Ciencais (Annals of the Brazilian Academy of Sciences). (2002) 74(1): pp. 113-126.*

* cited by examiner

COMBINED PRE-TREATMENT PROCESS FOR ENABLING FEED MATERIAL TO BE CHARGED IN DIRECT REDUCTION PROCESSES

CROSS REFERENCE TO RELATED APPLICATION

This application claims the benefit of U.S. Provisional Application No. 60/450,855, filed Feb. 28, 2003.

FIELD OF THE INVENTION

The present invention relates to a method and apparatus for pre-treatment of solid lump feed material for gas and pellet/lump-based moving bed direct reduction processes, and more particularly to a method and apparatus for storing and pre-drying the solid lump feed prior to charging in the direct reduction furnace, followed by raising the effective reducing temperature throughout the moving bed.

generally about 850 C., which will not cause the burden to melt. The reducing gas moves upward through the burden, heating the burden and reacting with the iron oxide in it to form metallized iron. The reacted gas is removed from the top of the furnace, and the reduced iron pellets and/or lumps continue their downward movement, are usually cooled in the lower portion of the furnace, and are discharged for further use The efficiency of thermal and chemical exchange between the burden and the gas is highly related to the amount of fines generated within the furnace due to degradation of the lumps or pellets occurring from thermal shock and/or from reduction at low temperatures (less than about 750 C.).

DESCRIPTION OF THE PRIOR ART

Applicants are aware of the following US Patents concerning moving bed direct reduction processes:

| U.S. Pat. No. | Issue Date | Inventor | Title |
| --- | --- | --- | --- |
| 6,475,264 B1 | Nov. 05, 2002 | Dry | DIRECT SMELTING PROCESS |
| 6,395,056 | May 28, 2002 | Villareal-Trevino et al | METHOD FOR THE HEAT TREATMENT OF IRON ORE LUMPS IN A REDUCTION SYSTEM |
| 6,379,421 B1 | Apr. 30, 2002 | Salinas-Fernandez | METHOD AND APPARATUS REMOVING UNDESIRABLE METALS FROM IRON-CONTAINING MATERIALS |
| 6,277,324 B1 | Aug. 21, 2001 | Joo, et al. | APPARATUS FOR MANUFACTURING MOLTEN PIG IRON AND REDUCED IRON BY UTILIZING A FLUIDIZED BED |
| 6,224,649 B1 | May 01, 2001 | Villarreal-Trevino | METHOD AND APPARATUS FOR REDUCING IRON-OXIDES-PARTICLES HAVING A BROAD RANGE OF SIZES |
| 6,132,489 | Oct. 17, 2000 | Villareal-Trevino | METHOD AND APPARATUS FOR REDUCING IRON-OXIDES-PARTICLES HAVING A BROAD RANGE OF SIZES |
| 5,785,733 | Jul. 28, 1998 | Lee, et al. | FLUIDIZED BED TYPE REDUCTION APPARATUS FOR IRON ORE PARTICLES AND METHOD FOR REDUCING IRON ORE PARTICLES USING THE APPARATUS |
| 5,961,690 | Oct. 05, 1999 | Kepplinger, et al. | PROCESS FOR PRODUCING MOLTEN PIG IRON OF LIQUID STEEL PREPRODUCTS AND PLANT FOR CARRYING OUT THE PROCESS |
| 5,531,424 | Jul. 02, 1996 | Whipp | FLUIDIZED BED DIRECT REDUCTION PLANT |
| 4,978,387 | Dec. 18, 1990 | Kepplinger | PROCESS FOR THE PRODUCTION OF MOLTEN PIG IRON |
| 3,591,363 | Jul. 06, 1971 | D. L. Campbell | RADIANT HEATED IRON ORE REDUCTION PROCESS |
| 3,295,956 | Jan. 03, 1967 | T. H. Whaley | ORE REDUCTION |
| 2,877,107 | Mar. 10, 1959 | J. F. Magness | FINES HANDLING PROCESS |

BACKGROUND OF THE INVENTION

In a shaft furnace reduction process, iron ore or iron oxide in lump or pelletized form is fed into the upper portion of the furnace to form a burden of such lumps and/or pellets. Reducing gas is introduced into the mid-portion of the shaft furnace, usually about the periphery, through a bustle and tuyere arrangement. The reducing gas introduction temperature is Villarreal-Trevino U.S. Pat. No. 6,395,056 teaches a method for handling a feed material with a high percentage of fines by feeding such material to a preheating device, wherein the particulate material is heated to a temperature above 600 C. in a non-reducing atmosphere, as a preheating step just prior to the step of charging the feed material into the furnace. The process of this patent attempts to preserve the strength of the iron ore particles, allowing the use of mechanically weak iron-oxide-containing particles. Therefore, their invention addresses degradation occurring during the reduction of the iron oxides, at temperatures above 600 C. However, some iron oxides may have, as a main cause of degradation in the direct reduction furnace, reduced ability to resist the thermal shock occurring when the material is charged into the furnace. Furthermore, some sedimentary lump ores, due to their peculiar morphology, need to release internal stresses prior to being subjected to high temperatures. These stresses may be released, either by increasing the lump storage time, or by pre-drying the lump at low temperatures (around 200 C), or by a combination of both.

SUMMARY OF THE INVENTION

The invented process is a pre-treatment for gas-based moving bed shaft furnace direct reduction processes, and is particularly useful with Midrex and Hyl Processes. Existing commercial iron ore reduction plants producing Direct Reduced Iron (DRI) rely on the feeding of pellets to maintain productivity of the furnace and homogeneity of the final DRI product. The most commonly used processes are very sensitive to finely divided (less than 6 mm) particulate material, denoted "fines" which are generated from the lumps or pellets that are fed to the reducing furnace during operation. Such generated fines will partially fill the interstices between the pellets and/or lumps, restricting the flow of hot reducing gas, and causing "channeling" of the gas. This results in localized hot spots within the furnace, which can cause the formation of incipiently fused pellets or lumps, called clusters, which in turn can cause furnace blockage. This can also result in the metallization of the product not being homogenous.

Due to the non-existence of microscopic hot bonds in lump ores, which would increase internal strength, lump ores generally have a greater tendency to produce fines than do pellets, when charged to a direct reduction furnace. In order to limit the amount of fines generated within the furnace, the proportion of lump ores fed to the furnace must be limited, in the vast majority of the cases.

Lump ore is just crushed and screened ore, and the lumps are not industrially produced as are pellets. Thus the cost of lump is less than the cost of the same weight of pellets. Any restriction on the amount of lump that can be used as a starting material becomes a financial penalty for the operation. Since the iron ore feed material is typically half or more of the cost of production of DRI, such a financial penalty can be significant.

The present invention pre-treats the feed material introduced to the direct reduction furnace, significantly reducing generation of fines. The invented process can be modified to be effective with a particular plant design.

It is known that sedimentary lump ores, such as naturally humid Corumba lump ore, have very little resistance to the combined effect of thermal shock and reduction at low temperatures, which fragment the lump, eventually resulting in a very high generation of fines (on the order of 40% of the initial weight) within the direct reduction furnace. It has now been determined that a combined pretreatment of Corumba lump ore will cause a dramatic reduction in fines generation: pretreatment combines storage in piles followed by predrying at low temperatures (<200 C.), which is followed by low-temperature reduction in the furnace, the furnace having an enhanced thermal profile, with an increase in its local and average temperatures. The cause of such mechanical weakness is attributed to the microstructure of Corumba lump ore, which is mainly constituted of micropores, as opposed to the widely known metamorphic lump ores, wherein the pores are usually larger in size. Therefore, an accentuated thermal shock drives out the retained moisture at a very high rate, resulting in the weakening of the microstructure and eventually leading to the generation of fines. In addition, it is understood within the direct reduction industry that reduction in the temperature of 500-750 C. within the furnace zone above the reduction zone results in low temperature decrepitation. The applicants have determined that the less reduction of ore that occurs at a temperature less than 800 C., the fewer fines are generated due to low temperature decrepitation. To achieve this, an enhanced thermal profile is provided in the direct reduction furnace, which increased the average temperature throughout the furnace.

It has also been determined that by storing Corumba lump ore for a predetermined and controlled time, followed by pre-drying the ore at a controlled rate/temperature and, finally, by operating the furnace at average temperatures higher than current operations, the amount of fines generated by Corumba lump ore is reduced dramatically to less than 10%. It is important to note that, although the invented pretreatment might also have an effect on metamorphic lump ores, a dramatic reduction in fines generation is not expected to be obtained in such case, given that the phenomena occurring during the invented pretreatment are intimately associated with the sedimentary nature of Corumba lump ore.

The reduction in fines generation will nonetheless increase the productivity of the direct reduction furnace. Metallized DRI fines have a substantially lower commercial value than the metallized DRI lump, and handling and disposal of unnecessary fines is costly. Productivity of the DRI furnace may also be increased by operating the furnace at higher temperatures, due to the lower residence time of the burden in the furnace. The increase in productivity, although likely to be at a higher cash cost, spreads the fixed costs of the plant, including capital costs, over greater volumes of product, improving the overall economics of the direct reduction process and the plant. As for thermal shock, it has been determined that: when lump ore is pretreated, a higher thermal shock is acceptable between the lump charged at the top and the gas at a higher temperature, because the microstructural changes undergone by the lump during pretreatment increase its mechanical strength and resistance to abrasion within the furnace.

OBJECTS OF THE INVENTION

It is an object of this invention to provide a method for lessening the production of fines from a gas-based direct reduction process.

It is also an object of the invention to provide means for achieving a steady-state operation of a gas-based direct reduction process at higher local temperatures and higher average temperatures than is possible with current processes.

DETAILED DESCRIPTION

Figure 1:
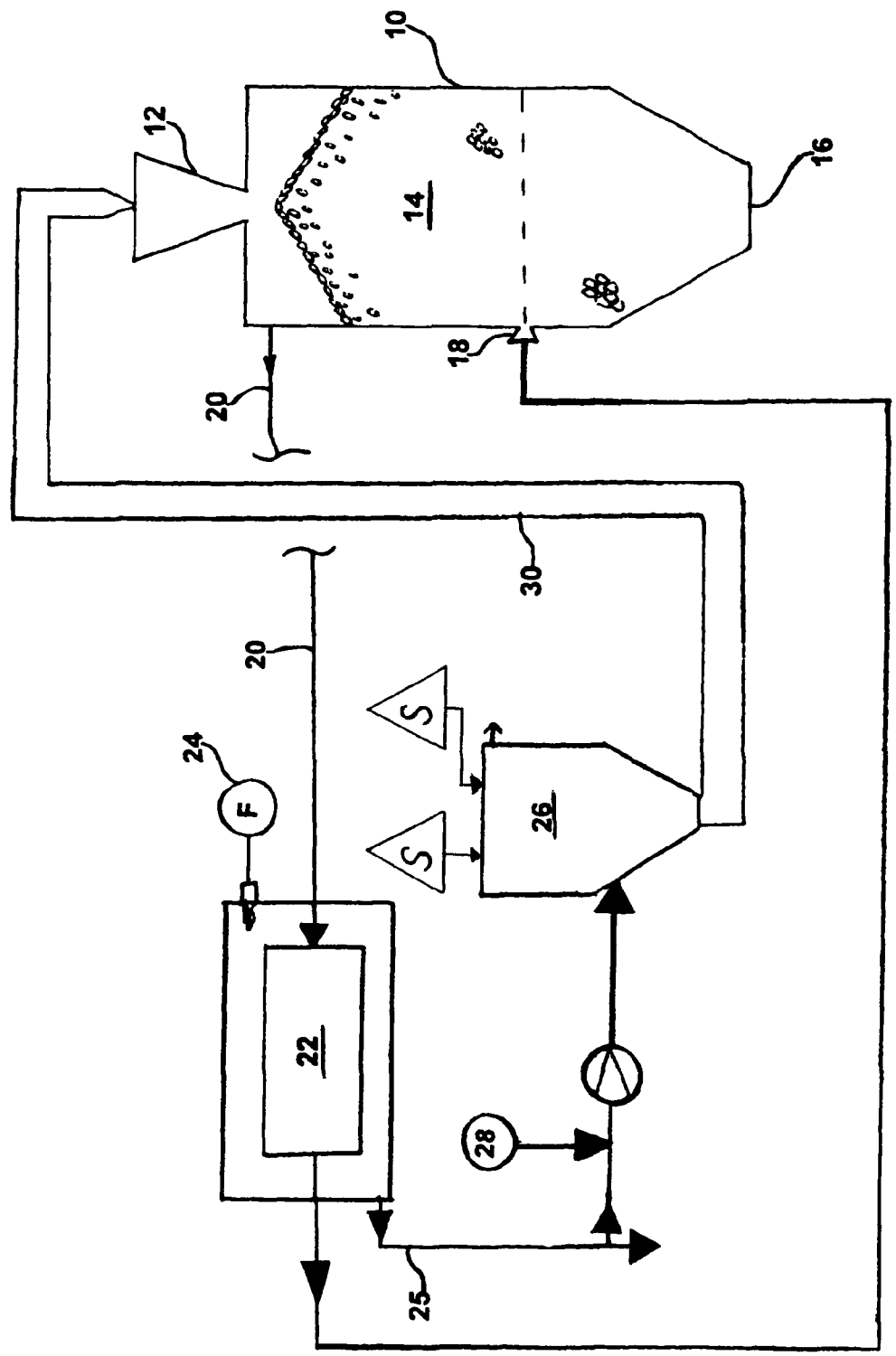
FIG. 1 is a schematic process diagram showing the process and the apparatus for carrying out the invented process.

As shown in FIG. 1, a direct reduction furnace 10 has an upper charging end with means 12 for charging lump ore and/or oxide pellets into the furnace to form a burden 14. The lower end 16 of the furnace has a discharge means for discharging the reduced metallized product from the furnace, and causing the burden to move downwardly as the metallized product is removed. At the middle of furnace is a reducing gas injection system 18 made up of a bustle and tuyeres. Hot reducing gas is injected into the furnace through the bustle and tuyeres.

Reacted reducing gas, or spent off-gas, principally carbon dioxide and steam, is removed from top of the furnace at 20, cleaned, and passed through a reformer 22 to change it to reducing gas, principally hydrogen and carbon monoxide, for reintroduction to the furnace through the bustle and tuyeres. The fuel gas 24 utilized for heating the reformer is combusted and results in a hot waste off-gas 25 from which heat is usually recovered. Combustion causes the waste gas to be oxidized, so that it is principally a mixture of nitrogen and carbon dioxide, which are inert, or at least non-reducing.

Lump ore feed is stored for a few months in stockpiles S before being reclaimed and stored in a bin 26. The stockpile storage is for a period of one month to several months, as necessary. This procedure allows the release of internal stresses, increasing the efficiency of the subsequent pre-drying, which has the objective of avoiding mechanical weakness of the lump ore during thermal shock and reduction at low temperatures. In accordance with the present invention, hot waste off-gas 25 is removed from the reformer heating chamber, may be passed through a heat recovery system, such as a boiler, is compressed, and passed through the storage bin 26 to heat the ore therein to at least about 200 degrees C., but preferably to at least 300 degrees C. The off-gas is introduced to the bin at a controlled temperature. The temperature of the off-gas can be tempered by introduction of cooling air 28, as necessary. After pre-drying of the iron ore charge material, it is transported through a thermally insulated charging system 30 to the furnace, and is then introduced to the upper portion of the furnace to form the burden. A dynamic seal arrangement may be utilized to provide thermal insulation. Moisture in the lump iron ore is a problem which must be and is overcome by preheating and pre-drying the iron ore, which reduces the water content of the pellet or lump from about 4% to less than 0.5%.

The preheated iron ore increases in temperature from its introduction temperature of about 150 C. to more than 750 C. in less than 30 minutes, for an enhanced thermal profile. This can be done with a decrease in the H₂/CO ratio of the reformer gas, and with a reduction in the upflow volume of natural gas and reducing gas within the furnace.

Figure 2:
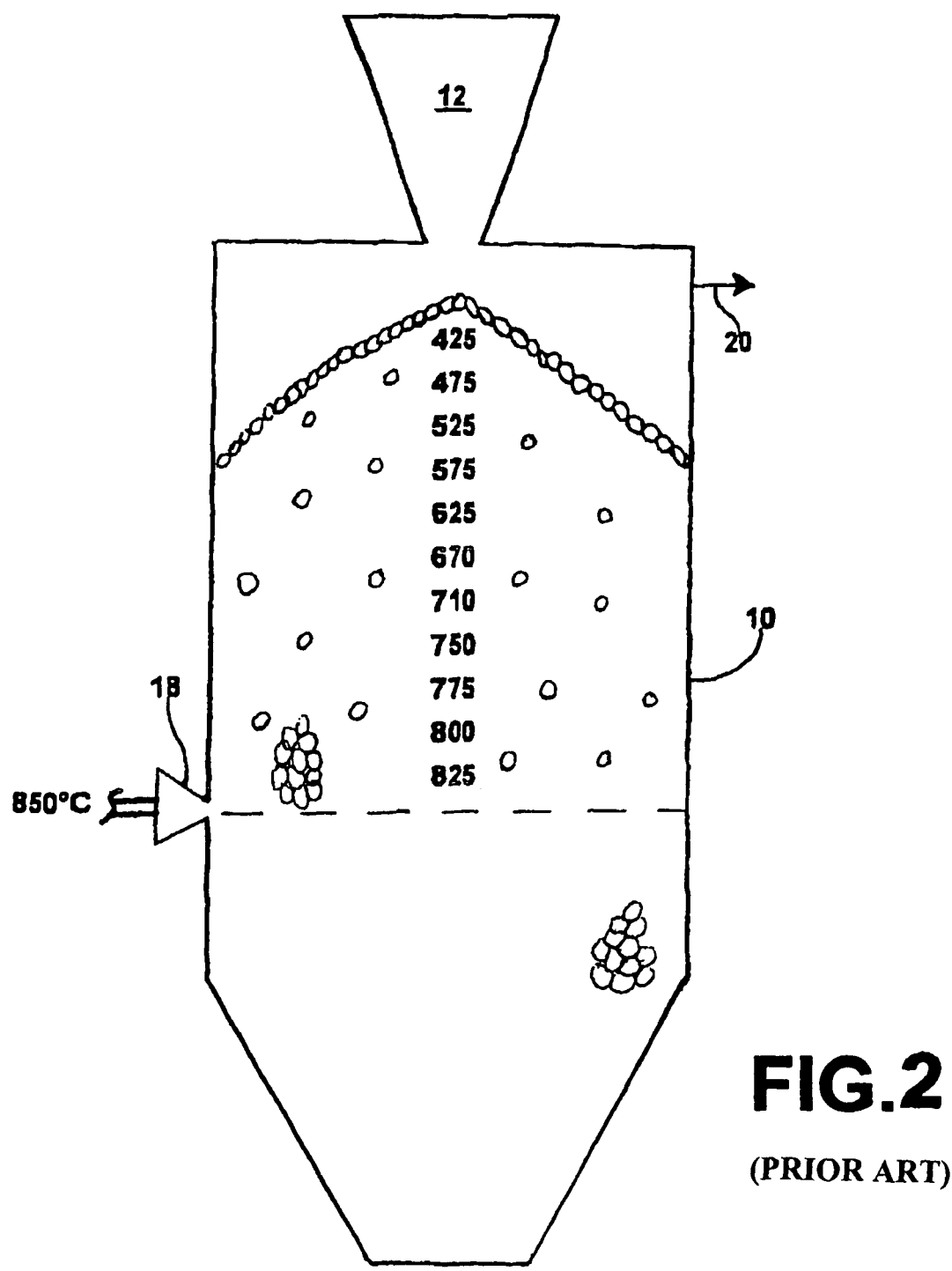
FIG. 2 is a schematic view of a direct reduction furnace showing a typical temperature profile of the prior art.
Figure 3:
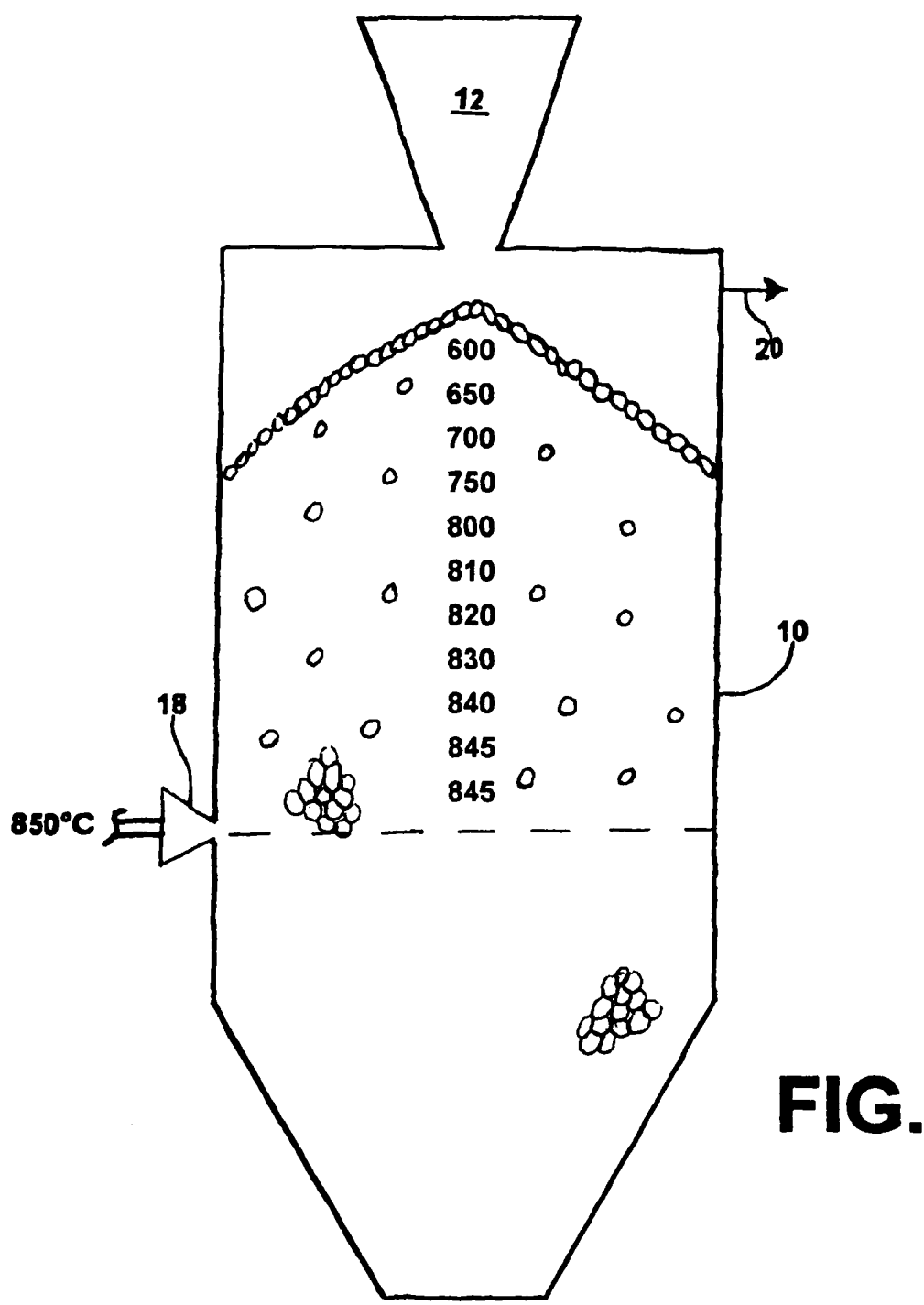
FIG. 3 is a schematic view of a direct reduction furnace showing a temperature profile when utilizing the invented process.

FIG. 3 shows the enhanced temperature profile in the direct reduction furnace when utilizing the invented process. This is to be compared to the prior art temperature profile shown in FIG. 2, which shows that the present invention reduces the zone of low-temperature reduction.

Pre-drying the lump charge material requires subsequent separate charging of the lump ore, to avoid it re-acquiring moisture from the contact with pellets that have been submitted to a lime (CaO) coating process. The invented process requires very little additional operating cost as the waste gas from the reformer operation is already available.

While the invention has been described in relation to direct reduction plants that utilize gas reformers, in the event that an installation does not have reformers, a different heating mechanism is required. Also, if a reformer produces waste gas with insufficient heat content to raise the temperature of the charge material to about 200 C., alternative heating mechanisms can be used.

SUMMARY OF THE ACHIEVEMENTS OF THE INVENTION

From the foregoing, it is readily apparent that we have invented an improved method and apparatus for pretreatment of solid lump feed material for gas and pellet/lump-based direct reduction processes, by initially storing the lump feed in stockpiles for stress release, followed by pre-drying the feed material prior to charging into the reduction furnace and finally increasing the average temperature of the reduction furnace, in order to reduce the amount of reduction at low temperatures, thereby minimizing the formation of fines within the furnace.

It is to be understood that the foregoing description and specific embodiments are merely illustrative of the best mode of the invention and the principles thereof, and that various modifications and additions may be made to the method and apparatus by those skilled in the art, without departing from the spirit and scope of this invention, which is therefore understood to be limited only by the scope of the appended claims.

What is claimed is:

1. A process to produce a direct reduced iron product from lump feed material, comprising:
   providing lump feed material derived from naturally humid sedimentary iron ore having a microstructure consisting essentially of micropores;
   drying said lump feed material to a temperature of 150° C. to less than 200° C. and to a water content of less than 0.5% by weight; and
   charging said dried lump feed material to a gas-based direct reduction process, thereby increasing the temperature of the dried lump feed material to more than 750° C. within 30 minutes of said charging to said gas-based direct reduction process.

2. The process of claim 1, wherein said dried lump feed material is charged to the direct reduction process at a temperature of about 150° C.

3. The process of claim 1, wherein said step of drying said lump feed material includes placing it into a feed storage bin and oxidizing waste off-gases to heat said feed storage bin to effect said drying of said lump feed material.

4. The process of claim 1, further comprising charging said dried lump feed material from said feed storage bin to said direct reduction process via a thermally insulated charging system.

5. The process of claim 3, wherein said waste off-gases are supplied from a reformer associated with the direct reduction process.

6. The process of claim 3, wherein said waste off-gases are supplied to said storage bin at a temperature in excess of 300° C.

7. The process of claim 3, wherein said step of providing includes storing said lump feed material for a predetermined time of at least one month in an open atmosphere in a stockpile associated with said feed storage bin and thereafter drying said lump feed material.

8. A process to produce a direct reduced iron product from lump feed material, comprising:
   providing lump feed material derived from naturally humid sedimentary iron ore having a microstructure consisting essentially of micropores;
   storing said lump feed material for a predetermined time of at least one month in an open atmosphere in a stockpile associated with a feed storage bin;
   drying said lump feed material to a temperature of 150° C. to less than 200° C. and to a water content of less than 0.5% by weight; and
   charging said dried lump feed material through a thermally insulated charging system to an upper part of a gas-based direct reduction furnace and thereby increasing the temperature of said dried lump feed material to more than 750° C. within 30 minutes of said charging.

9. A process for producing direct reduced iron from lump feed material, comprising:
providing said lump feed material derived from naturally humid sedimentary iron ore having a microstructure consisting mainly of micropores;
storing said lump feed material for a predetermined time of at least one month in an open atmosphere in a stockpile associated with a feed storage bin and thereafter reclaiming said lump feed material;
drying said lump feed material to a temperature of 150° C. to a6effi less than 200° C. and to a water content of less than 0.5% by weight;
charging said lump feed material to a thermally insulated charging system to an upper part of a gas-based direct reduction furnace;
heating the direct reduction furnace to create an enhanced, narrow temperature profile inside the furnace thereby raising the average temperature inside the furnace; and
increasing the temperature of said charged lump feed material to more than 750° C. within 30 minutes of said charging.

10. The process of claim 9, wherein said dried lump feed material is charged to said direct reduction process at a temperature of about 150° C.

11. A process for producing direct reduced iron from lump feed material, comprising:
providing said lump feed material derived from naturally humid sedimentary iron ore having a microstructure consisting mainly of micropores;
storing said lump feed material for a predetermined time of at least one month in an open atmosphere;
reclaiming said lump feed material to a feed storage bin, supplying waste off-gases to said feed storage bin to effect said drying of said lump feed material;
drying said lump feed material to a temperature of 150° C. to less than 200° C. and to a water content of less than 0.5% by weight;
charging said lump feed material to a thermally insulated charging system to an upper part of a gas-based direct reduction furnace; and
increasing the temperature of said charged lump feed material to more than 750° C. within 30 minutes of said charging.

12. The process of claim 11, further comprising charging said dried lump feed material from said feed storage bin to said direct reduction process via a thermally insulated charging system.

13. The process of claim 11, wherein said waste off-gases are supplied from a reformer associated with said direct reduction furnace.

14. The process of claim 11, wherein said waste off-gases are supplied at a temperature in excess of 300° C.

* * * * *